(No Model.)
F. M. CLEMENT.
BEE HIVE.
No. 399,742. Patented Mar. 19, 1889.
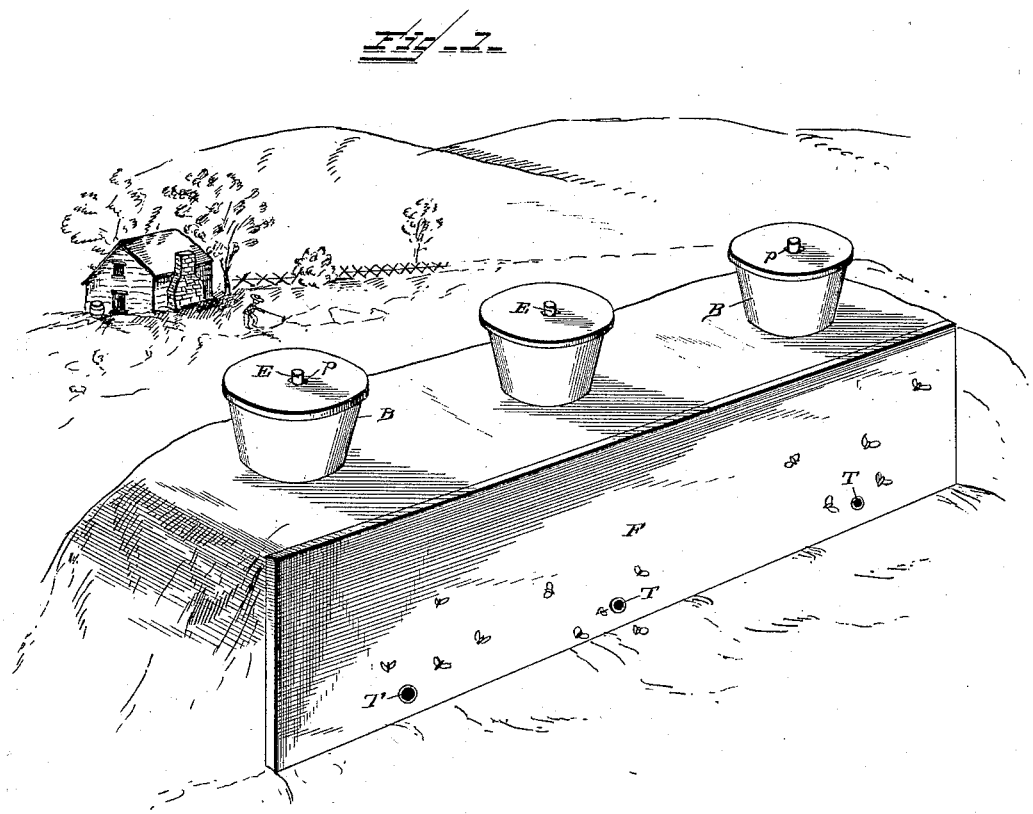
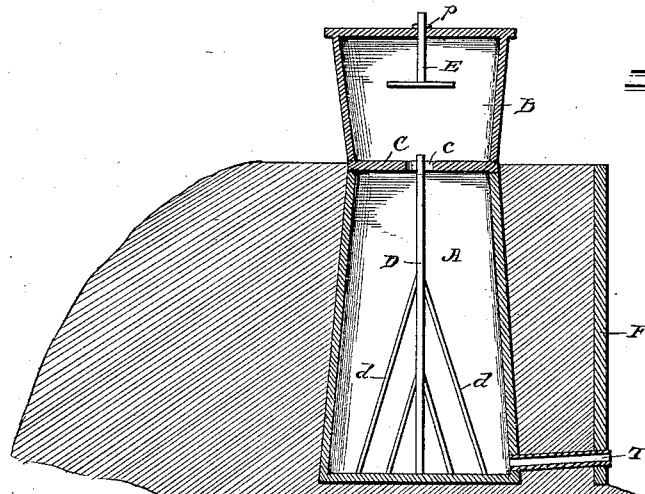
Witnesses,
Albert Speiden.
Robert Owens.
Inventor,
Francis M. Clement.
By his Attorney,
Wm Hunter Myers.

UNITED STATES PATENT OFFICE.

FRANCIS M. CLEMENT, OF MARION, KENTUCKY.

BEE-HIVE.

SPECIFICATION forming part of Letters Patent No. 399,742, dated March 19, 1889.

Application filed November 14, 1888. Serial No. 290,806. (No model.)

*To all whom it may concern:*

Be it known that I, FRANCIS M. CLEMENT, a citizen of the United States of America, residing at Marion, in the county of Crittenden and State of Kentucky, have invented certain new and useful Improvements in Bee-Hives, of which the following is a specification, reference being had therein to the accompanying drawings.

My invention relates to bee-hives; and it has for its object the production of a cheap and durable hive wherein the bees may be kept cool in summer and warm in winter.

The invention will first be described in connection with the accompanying drawings, and then pointed out in the claim.

Figure 1 of the drawings is a perspective view of a series of my improved hives in position for use. Fig. 2 is a vertical section of one of the hives, showing its interior construction.

My hive is made in two parts, A and B, preferably of terra-cotta or earthenware, such material being durable, easily molded to the required shape, and, when glazed, impervious to dampness.

The lower part, A, is the brood-chamber. It is about twice the height of the upper part, B. I prefer to make it substantially cylindrical or tapering slightly from the bottom, which is closed, to the top, which is open, but provided with a removable plate or cover, C, in the center of which is a hole, c. Inside this part A of the hive I place a vertical standard, D, supported at the bottom by braces d, while its upper end passes through hole c in cover C, and to this standard and its braces the bees attach the brood honey-comb. The entrance for the bees is through a tube, T, near the bottom of the brood-chamber.

The upper part, B, of the hive, which may be termed the "cap," is of the same general construction as the brood-chamber, only reversed—that is to say, its top is closed and its bottom is open, but rests on plate C, as seen in Fig. 2. It is provided inside with a wooden T-piece, E, to which the bees attach the surplus honey-comb. The stem of the T-piece passes through a perforation in the top of the surplus-honey chamber, and a pin, p, is passed through the end of the stem, whereby the T-piece is suspended within the said chamber.

In putting up my improved hive I spread a small quantity of earth on the surface of the ground and set the hive upon it. I then pile earth all around the hive to the top of the brood part A, facing the front of the embankment with a heavy plank, F, to form a vertical wall. By raising the part B above the surface of the ground water will be prevented from entering it through the entrance-tube, and by piling earth all around it the brood-chamber will be kept warm in winter and cool in summer. By reason of there being no place in the brood-chamber for moths to deposit their eggs, and it being kept cool in summer, the hive is practically moth-proof. When I wish to gather the honey, I drive out the pin p and push the stem of the T-piece down through the hole in the top of the surplus-honey chamber and then blow smoke into said chamber, when the bees will be driven down through the hole in plate C into the brood-chamber. I then draw a wire between the surplus-honey chamber and plate and sever the former, which I lift off, after which I paste paper over the hole in the plate or cover it in any other convenient manner until I can place another surplus-honey chamber in position or remove the honey from the chamber taken off and replace it.

Having thus described my invention, what I claim as new, and desire to secure by Letters Patent, is—

An earthenware bee-hive comprising a conical brood-chamber closed at its bottom and open at its top, a vertical standard within said chamber, an apertured plate on top of said chamber, a conical surplus-honey chamber open at its bottom and having an aperture in its top, resting on said plate, and a honey-comb support inside the surplus-honey chamber, removably secured in the aperture in the top, the brood-chamber being surrounded by an embankment of earth having a perforated face-plate and provided with an entrance-tube leading through the embankment and said face-plate, substantially as described.

In testimony whereof I affix my signature in presence of two witnesses.

FRANCIS M. CLEMENT.

Witnesses:
M. L. HAYS,
T. J. NUNN.